(12) United States Patent
Yoshida et al.

(10) Patent No.: US 12,427,600 B2
(45) Date of Patent: Sep. 30, 2025

(54) SPUTTER MEASUREMENT SYSTEM

(71) Applicant: Prime Planet Energy & Solutions, Inc., Tokyo (JP)

(72) Inventors: Takashi Yoshida, Kakogawa (JP); Akira Sakamoto, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 18/631,868

(22) Filed: Apr. 10, 2024

(65) Prior Publication Data

US 2024/0342824 A1    Oct. 17, 2024

(30) Foreign Application Priority Data

Apr. 12, 2023  (JP) ................. 2023-064676

(51) Int. Cl.
| | |
|---|---|
| *B23K 26/21* | (2014.01) |
| *B23K 26/03* | (2006.01) |
| *G06T 7/60* | (2017.01) |
| *G06V 10/44* | (2022.01) |
| *G06V 10/764* | (2022.01) |

(52) U.S. Cl.
CPC ............ *B23K 26/032* (2013.01); *B23K 26/21* (2015.10); *G06T 7/60* (2013.01); *G06V 10/44* (2022.01); *G06V 10/764* (2022.01); *G06T 2207/30136* (2013.01)

(58) Field of Classification Search
CPC ........ B23K 26/032; B23K 26/21; G06T 7/60; G06V 10/764; G06V 10/44
USPC ............................................................ 348/90
See application file for complete search history.

(56) References Cited

U.S. PATENT DOCUMENTS

| | | |
|---|---|---|
| 2001/0011669 A1 | 8/2001 | Hayata et al. |
| 2012/0229632 A1 | 9/2012 | Hoertenhuber et al. |
| 2016/0203596 A1 | 7/2016 | Kodama et al. |
| 2021/0016383 A1 | 1/2021 | Ando et al. |
| 2022/0134473 A1 | 5/2022 | Seebach et al. |

FOREIGN PATENT DOCUMENTS

| | | | |
|---|---|---|---|
| EP | 2 475 489 B1 | | 2/2015 |
| JP | H04-084705 A | | 3/1992 |
| JP | 2006035262 A | * | 2/2006 |
| JP | 2009028775 A | * | 2/2009 |
| JP | 2009220172 A | * | 10/2009 |
| JP | 2015-054343 A | | 3/2015 |
| JP | 2017-060968 A | | 3/2017 |
| JP | 2019-188421 A | | 10/2019 |
| JP | 2020175409 A | * | 10/2020 |
| JP | 2022-042153 A | | 3/2022 |

* cited by examiner

*Primary Examiner* — Jeffery A Williams
(74) *Attorney, Agent, or Firm* — Finnegan, Henderson, Farabow, Garrett and Dunner, LLP (57) ABSTRACT

A sputter measurement system includes: a camera that captures an image of an observation region including a molten portion that is melted during welding; a telecentric lens disposed between the molten portion and the camera; and a controller that measures a size of a sputter flying from a molten portion based on an image captured by the camera.

4 Claims, 8 Drawing Sheets

COMPARATIVE EXAMPLE
(BACK-LIGHT FOR GENERAL
IRRADIATION)

THE PRESENT DISCLOSURE
(BACK-LIGHT FOR IRRADIATION
WITH PARALLEL LIGHT)

SPUTTER MEASUREMENT SYSTEM

CROSS REFERENCE TO RELATED APPLICATIONS

This nonprovisional application is based on Japanese Patent Application No. 2023-064676 filed on Apr. 12, 2023 with the Japan Patent Office, the entire contents of which are hereby incorporated by reference.

BACKGROUND OF THE INVENTION

Field of the Invention

The present disclosure relates to a technology for measuring a sputter generated during welding.

Description of the Background Art

When welding a metal, there may occur a phenomenon in which a molten metal particle (sputter) in the form of a droplet flies from a surface of a molten portion that is melted during the welding. Since the sputter may decrease quality of the product after the welding, it is desirable to suppress generation of the sputter. For this purpose, first, it is desired to measure generation of the sputter.

As an exemplary apparatus for measuring generation of the sputter, for example, Japanese Patent Laying-Open No. 2019-188421 discloses an apparatus that can measure the number of sputters by performing image processing on data obtained by capturing an image of a welded portion using a camera during welding.

SUMMARY OF THE INVENTION

In order to more precisely measure a state of generation of sputters, it is desirable to measure not only the number of sputters but also the size (dimension) of each sputter. However, there is a concern that by simply capturing images of sputters using a camera, the sizes of the sputters cannot be precisely measured due to the following reason: even when the sputters actually have the same size, the sizes of the images of the sputters differ depending on whether the sputters are far from or close to the camera (depending on their distances to the camera) because an image of a sputter located at a position closer to the camera is larger in size.

The present disclosure has been made to solve the above-described problem, and has an object to allow for precise measurement of a size of a sputter regardless of whether or not the sputter is far from or close to a camera.

(Item 1) A sputter measurement system according to the present disclosure is a sputter measurement system that measures a size of a sputter flying from a molten portion that is melted during welding, the sputter measurement system including: a camera that captures an image of an observation region including the molten portion; a telecentric lens disposed between the molten portion and the camera; and a controller that measures the size of the sputter based on the image captured by the camera.

(Item 2) The sputter measurement system according to item 1 further includes a back-light source that emits parallel light toward the molten portion, the back-light source being disposed at a position facing the camera with the molten portion being interposed between the back-light source and the camera.

(Item 3) In the sputter measurement system according to item 2, a position of the molten portion is included in a depth-of-field region of the telecentric lens. The controller extracts a sputter image from the image captured by the camera, the controller classifies the extracted sputter image into a first sputter image having an edge with a gradation or a second sputter image having an edge with no gradation, and the controller measures a size of the second sputter image.

(Item 4) The sputter measurement system according to any one of items 1 to 3 further includes an optical filter disposed between the molten portion and the camera.

(Item 5) The sputter measurement system according to item 1 further includes: a light source that emits light having a first wavelength toward the molten portion, the first wavelength being different from a wavelength of light generated at and around the molten portion during the welding; and an optical filter that allows the light having the first wavelength to pass through the optical filter and that blocks the light generated at and around the molten portion during the welding, the optical filter being disposed between the molten portion and the camera.

(Item 6) In the sputter measurement system according to item 1, a position of the molten portion is included in a depth-of-field region of the telecentric lens. The camera captures the image of the observation region at a cycle shorter than a time for which the sputter is moved from the molten portion to outside of the depth-of-field region.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described in detail with reference to figures. It should be noted that in the figures, the same or corresponding portions are denoted by the same reference characters and will not be described repeatedly.

System Configuration

Figure 1:
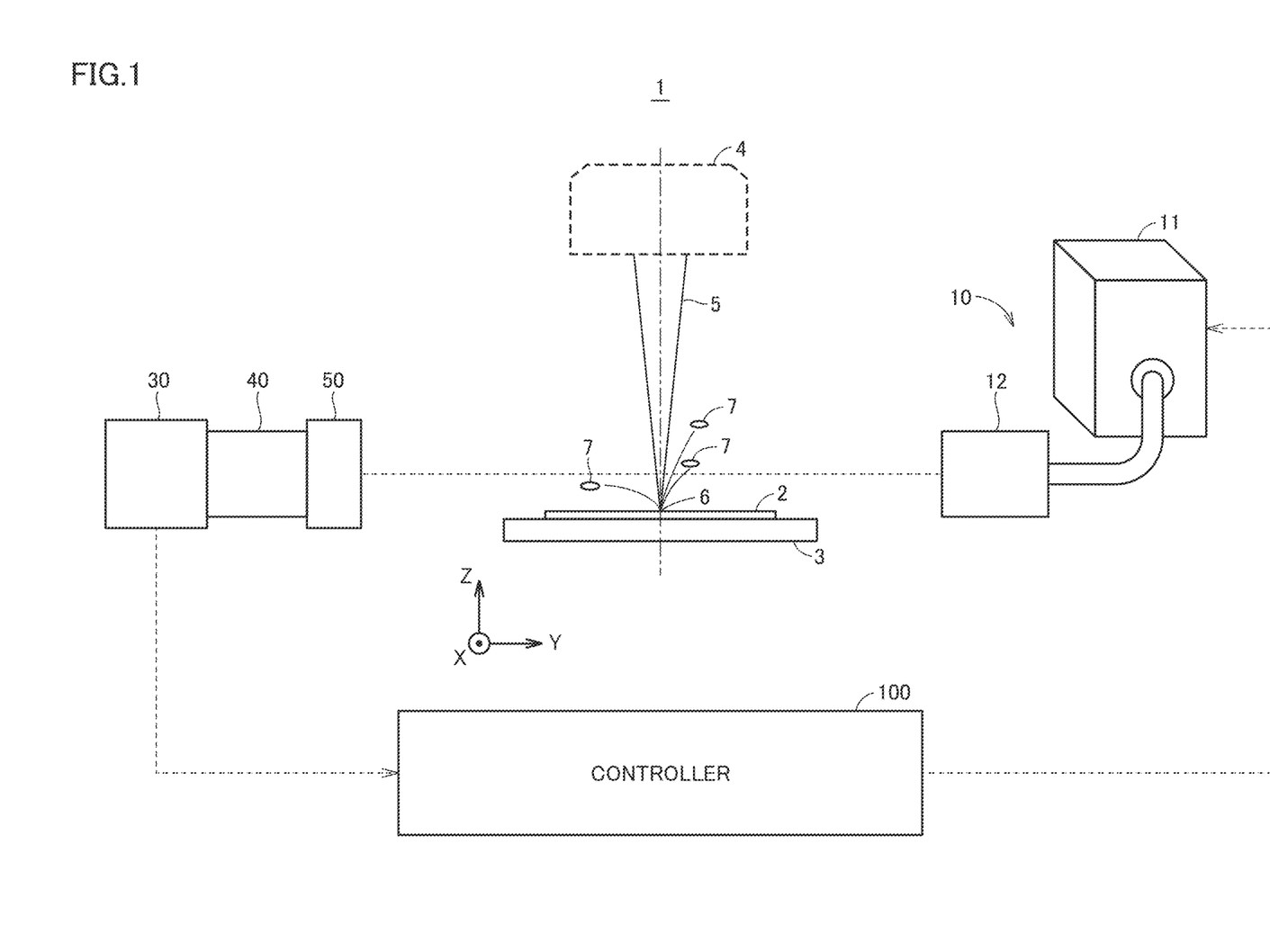
FIG. 1 is a first diagram schematically showing an exemplary overall configuration of a sputter measurement system.

FIG. 1 is a diagram schematically showing an exemplary overall configuration of a sputter measurement system 1 according to the present embodiment. Base members 2, 3 each composed of a metal are welded by laser light 5 emitted from a laser generation apparatus 4 for the sake of processing. A portion to which laser light 5 is applied during the welding is melted to become a molten portion 6. By moving laser generation apparatus 4 in a welding proceeding direction (X direction in the figure), a welding bead extending in the X direction in the figure is formed. It should be noted that in the figure, the X direction represents the above-described welding proceeding direction, the Z direction represents a normal direction of each of base members 2, 3, and the Y direction represents a direction orthogonal to the X direction and the Z direction.

During the welding of base members 2, 3, sputters 7 may fly from molten portion 6. Each of sputters 7 may decrease quality of the product after the welding. For example, in the case where the welding is performed to connect between a cell terminal of a power storage battery and a bus bar, flying of sputter 7 can be a factor of short-circuiting or disconnecting a wiring therearound due to sputter 7 breaking a resin coating material that covers the wiring, or can be a factor of short-circuiting a circuit of a substrate therearound due to sputter 7 being adhered between welding pins of the substrate. Therefore, it is desirable to suppress generation of sputter 7 itself or to ensure that no problem is caused even when sputter 7 is generated. For this purpose, first, it is desired to measure generation of the sputter.

In view of such a point, sputter measurement system 1 according to the present embodiment is configured to measure the size (dimension) of sputter 7 flying from molten portion 6. Specifically, sputter measurement system 1 includes a back-light source 10, a camera 30, a telecentric lens 40, an optical filter 50, and a controller 100.

Back-light source 10 emits parallel light as irradiation light for observation of the sputter. Back-light source 10 is disposed at a position facing camera 30 with molten portion 6 being interposed therebetween, and emits the parallel light toward molten portion 6 and camera 30 from the rear side with respect to molten portion 6 when viewed from camera 30. Specifically, back-light source 10 includes: a light source 11 that generates light having high luminance in accordance with a command from controller 100; and a parallel-light lens 12 that converts the light generated by light source 11 into parallel light and that emits the parallel light toward molten portion 6. Parallel-light lens 12, molten portion 6, and camera 30 are disposed straightly along the Y direction when viewed in the Z direction.

Camera 30 captures, at a high speed, an image of an observation region including molten portion 6 that is melted by laser light 5. It should be noted that a cycle of capturing an image by camera 30 will be described later. Camera 30 outputs, to controller 100, image data obtained by the image capturing.

Telecentric lens 40 is disposed in an optical path between molten portion 6 and camera 30. Telecentric lens 40 is a special lens that can produce light having a main optical axis parallel to the optical axis of the lens, unlike an ordinary lens. Due to its optical characteristic, telecentric lens 40 has a region (hereinafter also referred to as "depth-of-field region R1") in which the size of the image of the target is not changed even when a distance between camera 30 and the target is changed. Therefore, by capturing the image of the target, i.e., sputter 7 using camera 30 with telecentric lens 40 being interposed therebetween, the size of the image of sputter 7 is not changed regardless of the position of sputter 7 (even when the position of sputter 7 is deviated from the focal position due to flyinging) as long as sputter 7 is included in depth-of-field region R1 of telecentric lens 40, and distortion of the image due to parallax is not caused.

Optical filter 50 is disposed in an optical path between molten portion 6 and telecentric lens 40. A characteristic of optical filter 50 will be described later. It should be noted that optical filter 50 may be disposed at any position in the optical path between molten portion 6 and camera 30, and may be disposed between telecentric lens 40 and camera 30, for example.

Controller 100 includes a CPU (Central Processing Unit), and a memory such as a ROM (Read Only Memory) and a RAM (Random Access Memory). During the welding of base members 2, 3, controller 100 measures the size of sputter 7 flying from molten portion 6 based on image data captured by camera 30 with back-light source 10 being operated to apply the parallel light to the rear side of the observation region including molten portion 6.

Figure 2:
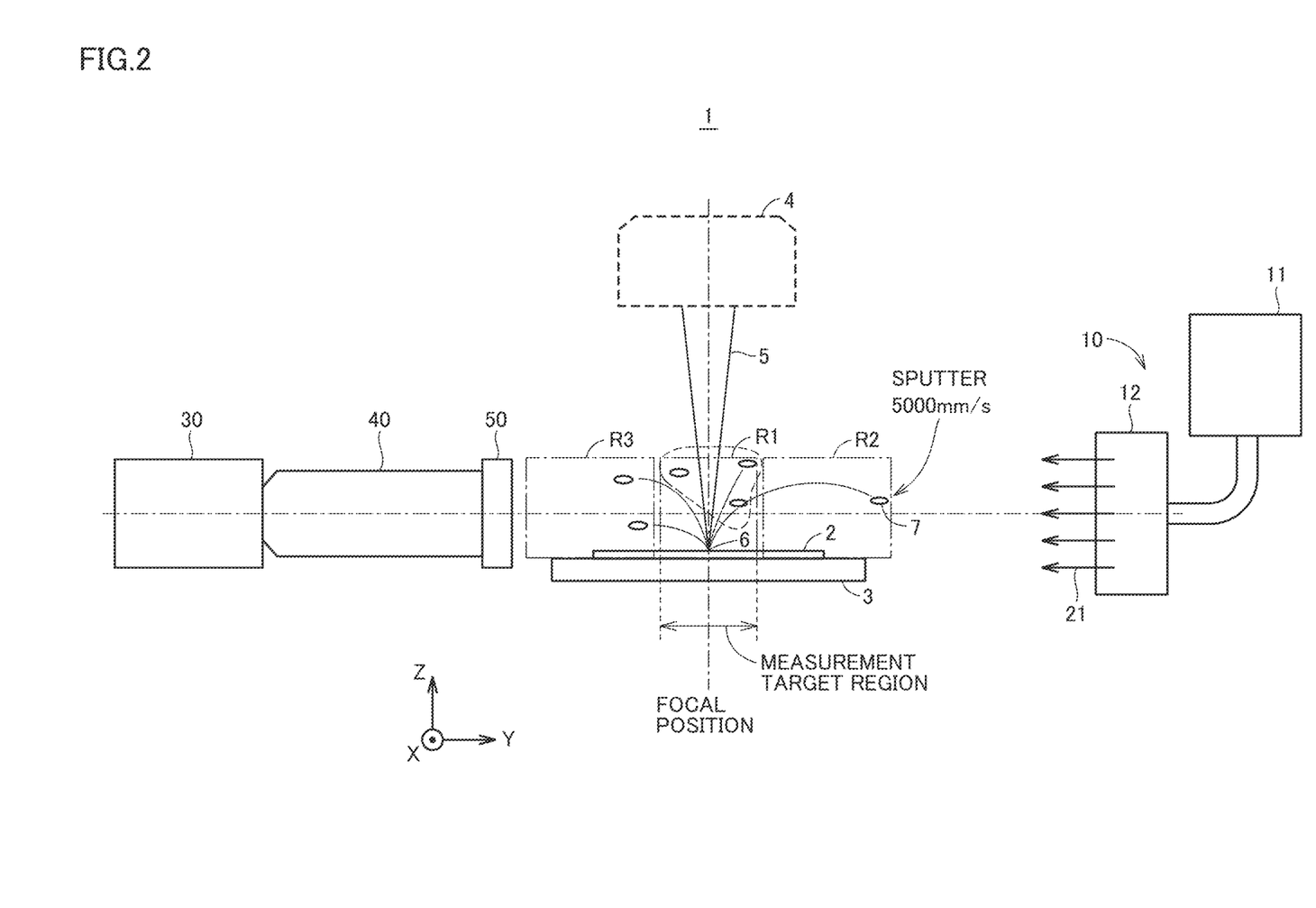
FIG. 2 is a diagram schematically showing a state in which sputters are measured by the sputter measurement system.

FIG. 2 is a diagram schematically showing a state in which sputters 7 are measured by sputter measurement system 1. Each of sputters 7 is measured in an in-process manner during the welding of base members 2, 3 by laser light 5. It should be noted that in the example shown in FIG. 2, the wavelength of laser light 5 is set to a value of, for example, about 1070 nm. A flying speed of sputter 7 is assumed to be about 5000 mm per second.

The observation region captured in image by camera 30 includes: a depth-of-field region R1 of telecentric lens 40; a remote region R2 far away from camera 30 with respect to depth-of-field region R1; and a close region R3 close to camera 30 with respect to depth-of-field region R1. It should be noted that depth-of-field region R1 is in a range of several mm from the focal position.

During the measurement of sputter 7, parallel light 21 is emitted from back-light source 10. Parallel light 21 emitted from back-light source 10 passes through remote region R2, depth-of-field region R1, close region R3, and telecentric lens 40 in this order, and reaches camera 30.

When no sputter 7 exists in the observation region, the entire image of the observation region becomes a bright spot because there is no object that blocks parallel light 21.

On the other hand, when sputter 7 exists in the observation region, parallel light 21 is blocked by sputter 7, with the result that a portion at which sputter 7 exists is captured in the image as a dark spot. That is, in the present embodiment, a shadow of sputter 7 is captured in the image by camera 30 by applying parallel light 21 toward camera 30 from the rear side with respect to sputter 7 that is the measurement target.

When sputter 7 exists in depth-of-field region R1, the size of the image (dark spot) of sputter 7 is not changed depending on whether or not sputter 7 is far from or close to camera 30 (depending on its distance to camera 30). Therefore, even when sputter 7 is moved due to flying, the size of the image of sputter 7 is substantially unchanged as long as sputter 7 exists in depth-of-field region R1.

On the other hand, when sputter 7 exists outside depth-of-field region R1, that is, when sputter 7 exists in remote region R2 or close region R3, the size of the image (dark spot) of sputter 7 is changed depending on whether sputter 7 is far from or close to camera 30 (its distance to camera 30).

Therefore, controller 100 according to the present embodiment excludes, from the dimension measurement target, the image of sputter 7 existing outside depth-of-field region R1 among the images (dark spots) of the sputters captured by camera 30, and employs, as the dimension measurement target, the image of sputter 7 existing within depth-of-field region R1.

Figure 3:
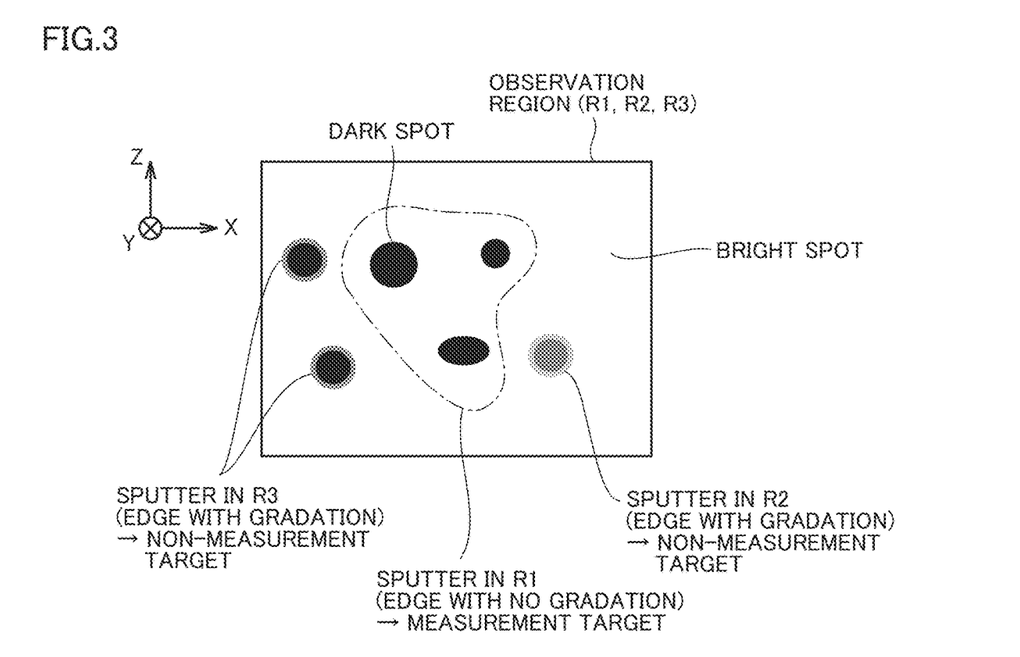
FIG. 3 is a diagram showing an exemplary image of an observation region captured by a camera.

FIG. 3 is a diagram showing an exemplary image of the observation region captured by camera 30.

Each of the dark spots included in the image of the observation region is an image of a sputter. Among them, an image of a dark spot existing in remote region R2 or close region R3 has an edge with a gradation. In other words, the dark spot image having an edge with a gradation is an image of a sputter existing in remote region R2 or close region R3, is changed in size depending on whether the sputter is far from or close to camera 30, and is therefore not appropriate as the dimension measurement target. It should be noted that the image of the sputter existing in remote region R2 has a luminance lower than that of the image of the sputter existing in close region R3; however, this difference is considered to be a difference in influence of diffraction of the light.

On the other hand, the image of sputter 7 existing in depth-of-field region R1 has an edge with no gradation. In other words, the dark spot image having an edge with no gradation is an image of a sputter existing in depth-of-field region R1, and is not changed in size depending on whether the sputter is far from or close to camera 30, and is therefore appropriate as the dimension measurement target.

In view of these points, controller 100 according to the present embodiment extracts a sputter image (dark spot) from the image captured by camera 30, and classifies the extracted sputter image into a first sputter image having an edge with a gradation or a second sputter image having an edge with no gradation. Then, controller 100 excludes the first sputter image from the dimension measurement target and employs the second sputter image as the dimension measurement target. That is, controller 100 measures the size of the second sputter image as the size of the sputter. Thus, the size (dimension) of the sputter can be precisely measured.

Figure 4:
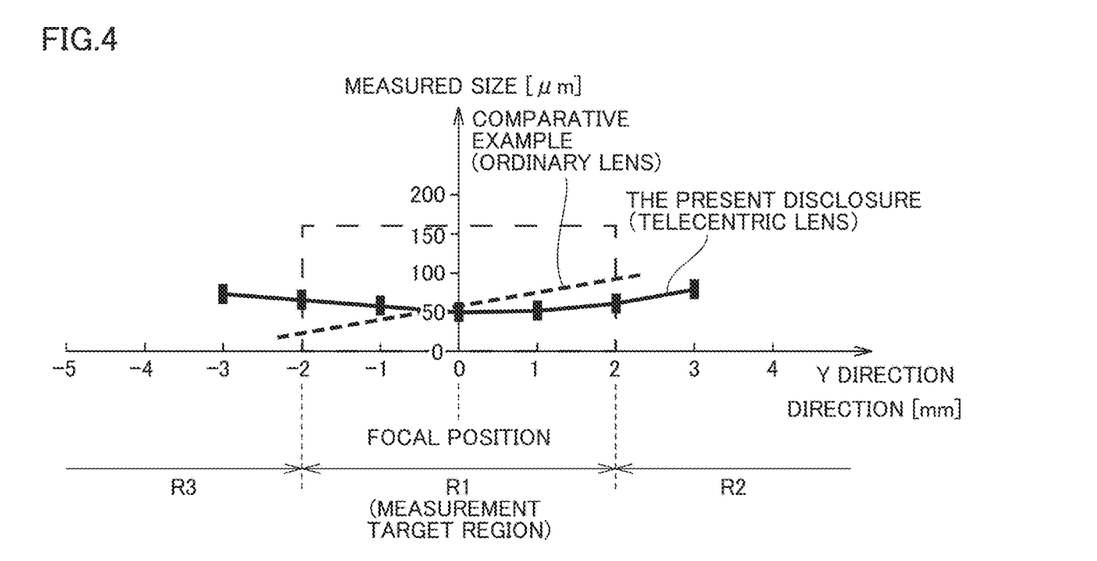
FIG. 4 is a diagram showing exemplary results of measuring dimensions of the sputters.

FIG. 4 is a diagram showing exemplary results of measuring the dimensions of the sputters using image analysis software. In this example, results of measuring sputters each having a size of 50 μm are shown. It should be noted that in FIG. 4, the horizontal axis represents a distance in the Y direction, wherein the focal position is set as an origin and a side close to camera 30 represents a positive value, whereas the vertical axis represents a measured size of each sputter. Further, in FIG. 4, the position of molten portion 6 is set to correspond to the origin (focus position), and a region in a range of less than +2 mm from the origin is set to correspond to depth-of-field region R1 of telecentric lens 40.

When an ordinary lens, which is not a telecentric lens, is used, an image of a sputter is larger in size as the sputter is closer to the camera, with the result that the measured size of the sputter is larger as the sputter is closer to the camera (see a dotted line for the comparative example).

On the other hand, when telecentric lens 40 is used as in the present embodiment, the measured size of the sputter is substantially unchanged to be 50 μm in depth-of-field region R1 of telecentric lens 40 regardless of whether the sputter is far from or close to the camera. From this measurement result, it is understandable that the size of sputter 7 can be precisely measured in the present embodiment.

Although the measured size of the sputter at a position away from the focal position by ±2 mm or more (sputter existing in remote region R2 or close region R3) is deviated from 50 μm, the image of the sputter existing in remote region R2 or close region R3 is excluded from the dimension measurement target in the present embodiment as described with reference to FIG. 3. Therefore, precision in the measurement of sputter 7 is suppressed from being decreased.

However, in order to measure the sizes of the generated sputters securely, the image of each of the sputters generated at the molten portion needs to be captured before the sputter flies to the outside of depth-of-field region R1. Therefore, camera 30 according to the present embodiment is set to capture the image of the observation region at a high speed at a cycle shorter than a time for which the sputter is moved from the molten portion to the outside of depth-of-field region R1. For example, when the flying speed of the sputter is assumed to be about 5000 mm per second, the cycle of capturing an image by camera 30 is set to a time shorter than 0.0004 (=2/5000) second in order to capture the image of the sputter before the sputter flies to the outside of depth-of-field region R1 (region in the range of less than ±2 mm from the focal position) shown in FIG. 4. Thus, the size of the generated sputter can be measured securely.

Irradiation with Parallel Light by Back-Light Source 10

In sputter measurement system 1 according to the present embodiment, a parallel light irradiation method is employed in which the light emitted by back-light source 10 is converted into parallel light by using parallel-light lens 12. With this, the edge of the image (dark spot) of the sputter can be extracted more precisely than general irradiation with general light.

Figure 5:
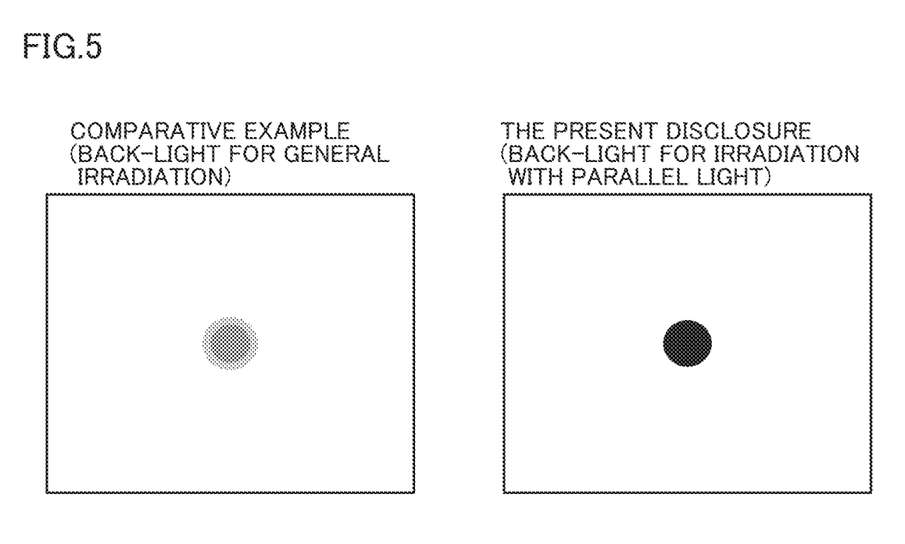
FIG. 5 is a diagram for comparison between a sputter image of a comparative example and a sputter image of the present disclosure.

FIG. 5 is a diagram for a comparison between a sputter image when irradiation by back-light source 10 is general irradiation (comparative example) and a sputter image when irradiation by back-light source 10 is irradiation with parallel light (the present disclosure).

In the general irradiation, diffraction of the light is likely to occur, with the result that the shape of the edge of the sputter image is affected to be unclear. On the other hand, in the irradiation with parallel light, the light is parallel and therefore the diffraction of the light is reduced even when the sputter has a spherical shape or cylindrical shape, with the result that the shape of the edge of the sputter image becomes clear. Thus, the dimension of the sputter can be measured more precisely.

Characteristic of Optical Filter 50

In sputter measurement system 1 according to the present embodiment, optical filter 50 is disposed in the optical path between molten portion 6 and telecentric lens 40 as described above.

During the welding, each of various types of light such as spontaneous light emitted by molten portion 6, spontaneous light emitted by sputter 7, plasma light emitted by a fume (metal chemical vapor) generated from molten portion 6, and the laser light for processing is generated at or around molten portion 6; however, optical filter 50 has such a characteristic that each light is blocked whereas the parallel light by back-light source 10 is permitted to pass therethrough.

Figure 6:
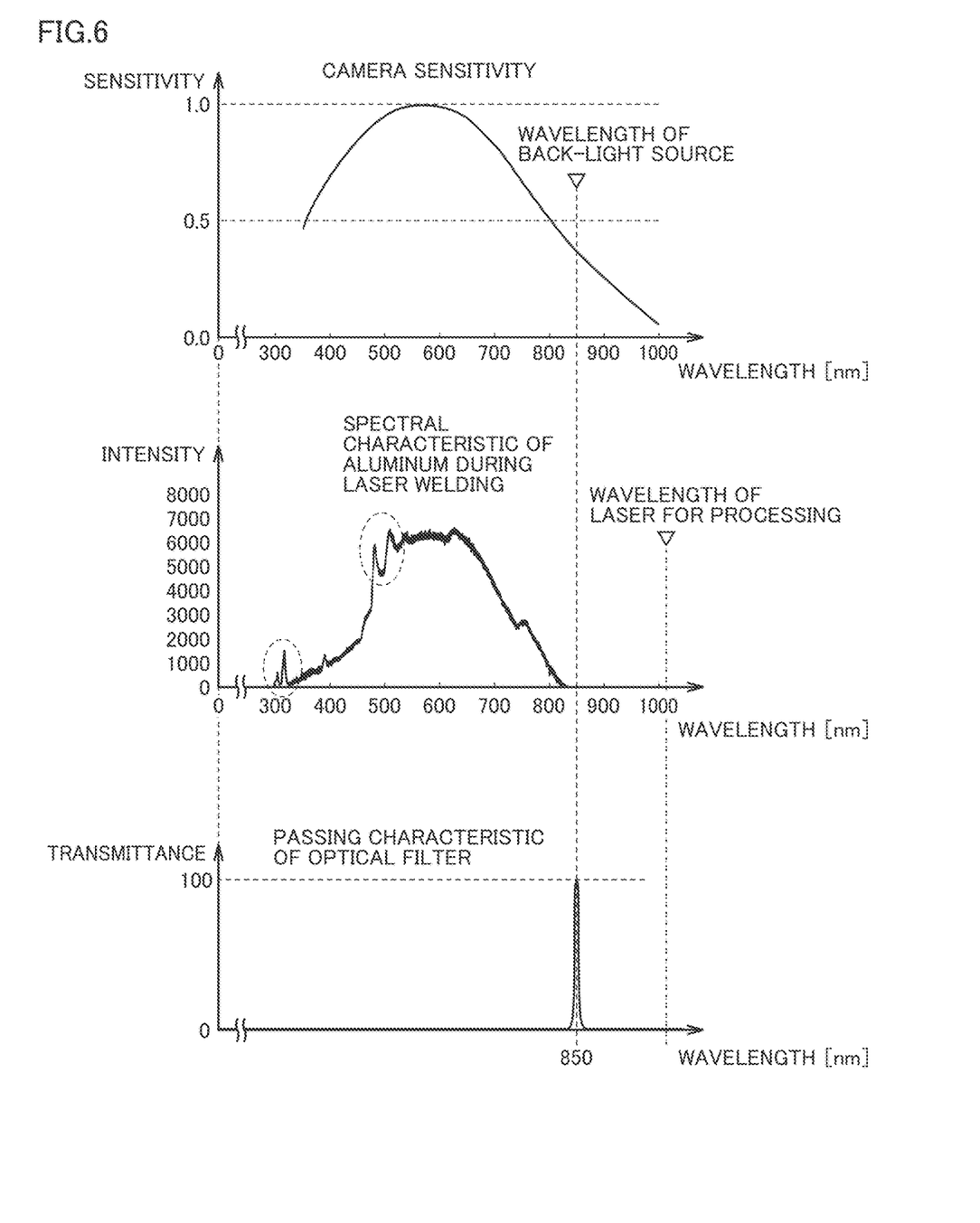
FIG. 6 is a first diagram showing an exemplary passing characteristic of an optical filter.

FIG. 6 is a diagram showing an exemplary passing characteristic of optical filter 50. It should be noted that in the example shown in FIG. 6, a sensitivity characteristic of camera 30, a spectral characteristic of aluminum during the laser welding, and the passing characteristic of optical filter 50 are shown in the order from the top. It should be noted that aluminum is an exemplary material of each of base members 2, 3 to be welded.

As shown in the middle part of FIG. 6, during the laser welding of the aluminum, light having a wide wavelength range of 300 to 830 nm is generated. The light includes the spontaneous light emitted by molten portion 6, the spontaneous light emitted by sputter 7, the plasma light emitted by the fume, and the like. It should be noted that a local increase in intensity at about each of 300 nm and 500 nm is considered to result from influence of the plasma light emitted by the fume. Each light is unnecessary for the measurement of the sputter, and is fluctuated in a large range and is therefore not suitable for measurement. Also, the laser light for processing as having a wavelength of about 1070 nm is not necessary for the measurement of the sputter.

On the other hand, in order to measure the sputter, parallel light 21 for observation as emitted from back-light source 10 needs to be captured in image by camera 30.

Therefore, in the present embodiment, the wavelength of parallel light 21 for observation as emitted from back-light source 10 is set to 850 nm, which is a value different from that of the wavelength (300 to 830 nm as well as 1070 nm) of the light generated at and around molten portion 6 during the welding. It should be noted that the light having a wavelength of 850 nm is light that can be sufficiently captured in the image although the sensitivity of camera 30 is slightly decreased.

On the other hand, as shown in the lower part of FIG. 6, optical filter 50 employed herein has such a characteristic that the light having a wavelength of around 850 nm is permitted to pass therethrough and light having another wavelength is blocked. Thus, parallel light 21 (light having a wavelength of around 850 nm) is input to camera 30, and the light having another wavelength is blocked. Therefore, the fluctuated light (the spontaneous light, the light of the fume, the plasma light, and the laser light for processing) unnecessary for the measurement of the sputter and unsuitable for the measurement can be blocked as noise light, with the result that the sputter can be observed using parallel light 21 for observation.

As described above, sputter measurement system 1 according to the present embodiment includes: camera 30 that captures the image of the observation region including molten portion 6; telecentric lens 40 disposed between molten portion 6 and camera 30; and controller 100 that measures the size of sputter 7 based on the image captured by camera 30.

Since telecentric lens 40 is thus disposed between molten portion 6 and camera 30, the size of sputter 7 can be precisely measured regardless of whether or not sputter 7 is far from or close to camera 30 (whether or not sputter 7 is located at a position close to camera 30 with respect to molten portion 6).

Further, sputter measurement system 1 according to the present embodiment includes back-light source 10 that emits parallel light 21 toward molten portion 6, back-light source 10 being disposed at a position facing camera 30 with molten portion 6 being interposed between back-light source 10 and camera 30.

In this way, back-light source 10 is disposed on the optical axis of telecentric lens 40, and the parallel light emitted by back-light source 10 is applied to sputter 7 from the rear side. Thus, sputter 7 can be captured in image as a dark spot by camera 30, with the result that the size of sputter 7 can be measured more precisely.

Further, in sputter measurement system 1 according to the present embodiment, molten portion 6 is disposed such that the position of molten portion 6 is included in depth-of-field region R1 of telecentric lens 40. Controller 100 extracts a sputter image from the image captured by camera 30, and classifies the extracted sputter image into a first sputter image having an edge with a gradation or a second sputter image having an edge with no gradation. Controller 100 excludes the first sputter image from the measurement target, and measures the size of the second sputter image as the size of the sputter.

In this way, the size of the image of the sputter in depth-of-field region RI can be measured with the image of the sputter outside depth-of-field region R1 being excluded, with the result that the size of the sputter can be measured more precisely.

Further, sputter measurement system 1 according to the present embodiment further includes optical filter 50 disposed between molten portion 6 and camera 30. With this optical filter 50, the noise light unnecessary for the measurement of the sputter can be blocked.

Further, in sputter measurement system 1 according to the present embodiment, the wavelength of the light emitted by back-light source 10 is set to the value (850 nm) different from that of the wavelength (300 to 830 nm as well as 1070 nm) of the light generated at and around molten portion 6 during the welding. Moreover, optical filter 50 has such a characteristic that light having a wavelength of around 850 nm and emitted by back-light source 10 is permitted to pass therethrough and light having another wavelength is blocked. Thus, the light generated at and around molten portion 6 during the welding can be blocked as noise light.

Further, in sputter measurement system 1 according to the present embodiment, camera 30 is configured to capture the image of the observation region at a high speed at a cycle shorter than the time for which sputter 7 is moved from molten portion 6 to the outside of depth-of-field region R1.

Thus, sputter 7 can be captured in image at any timing during a period of time from the generation of sputter 7 at molten portion 6 to the movement of sputter 7 to the outside of depth-of-field region R1, with the result that the size of the generated sputter can be measured securely.

Modification 1

The characteristic of optical filter 50 shown in FIG. 6 is such that each light (the spontaneous light, the light of the fume, the plasma light, and the laser light for processing) generated at and around molten portion 6 during the welding is blocked as the noise light; however, the characteristic of optical filter 50 is not necessarily limited to the characteristic shown in FIG. 6.

Figure 7:
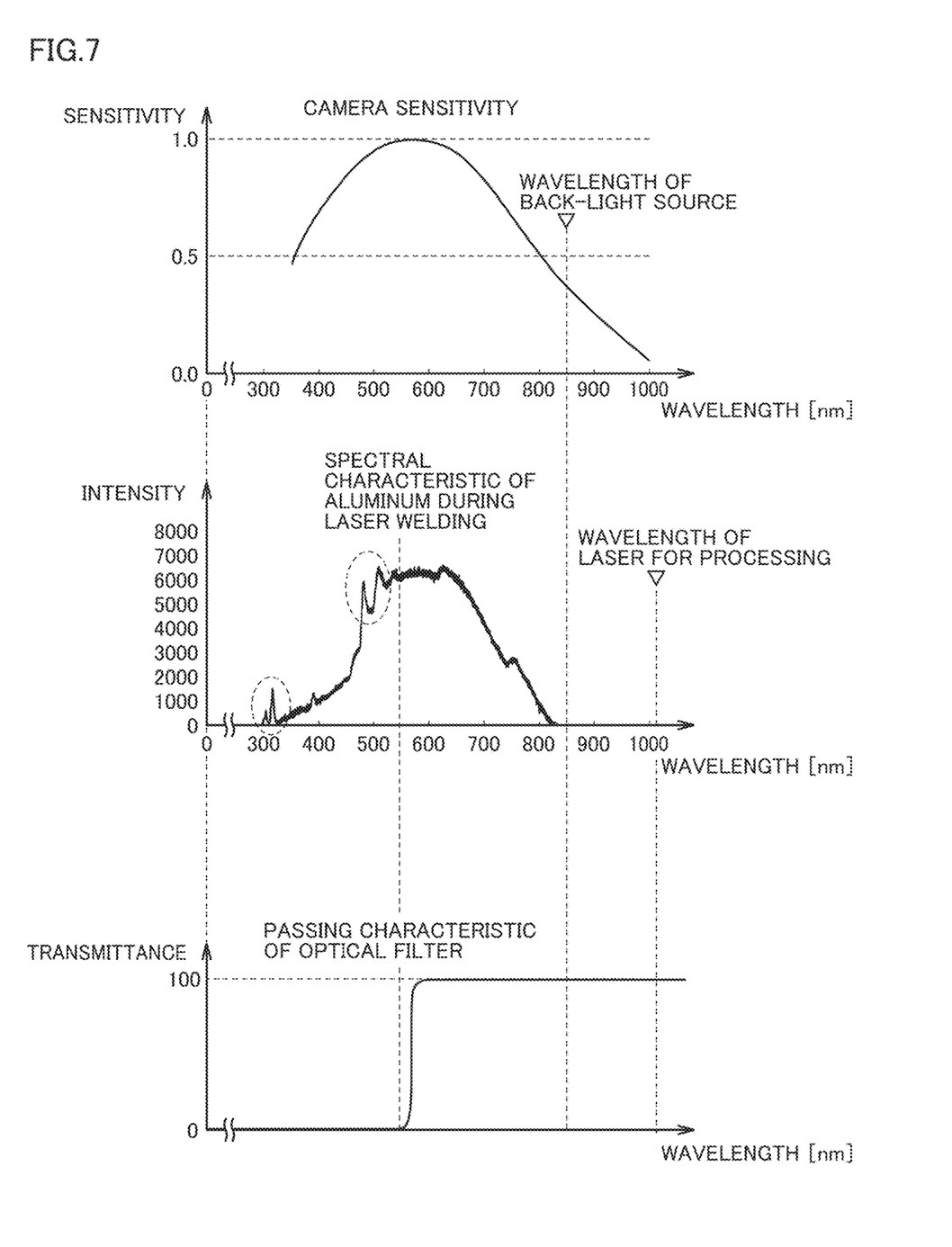
FIG. 7 is a second diagram showing an exemplary passing characteristic of the optical filter.

FIG. 7 is a diagram showing an exemplary passing characteristic of optical filter 50 according to a modification 1. In the passing characteristic of optical filter 50 shown in FIG. 7, light having a wavelength of less than 550 nm is blocked and light having a wavelength of 550 nm or more is permitted to pass therethrough. By disposing optical filter 50 having such a characteristic, at least light having a wavelength of around 300 nm and 500 nm and including the fume generated from molten portion 6 can be blocked. Thus, at least the emitted light of the fume in blue or similar color as unnecessary for the measurement of the sputter can be likely to be suppressed from being included in the image captured by camera 30. As a result, the size of sputter 7 can be precisely measured.

Modification 2

In the above-described embodiment, back-light source 10 is included to apply the irradiation light for the observation of the sputter from the rear side with respect to the sputter. However, the irradiation light for the observation of the sputter is not necessarily limited to being applied from the rear side with respect to the sputter.

Figure 8:
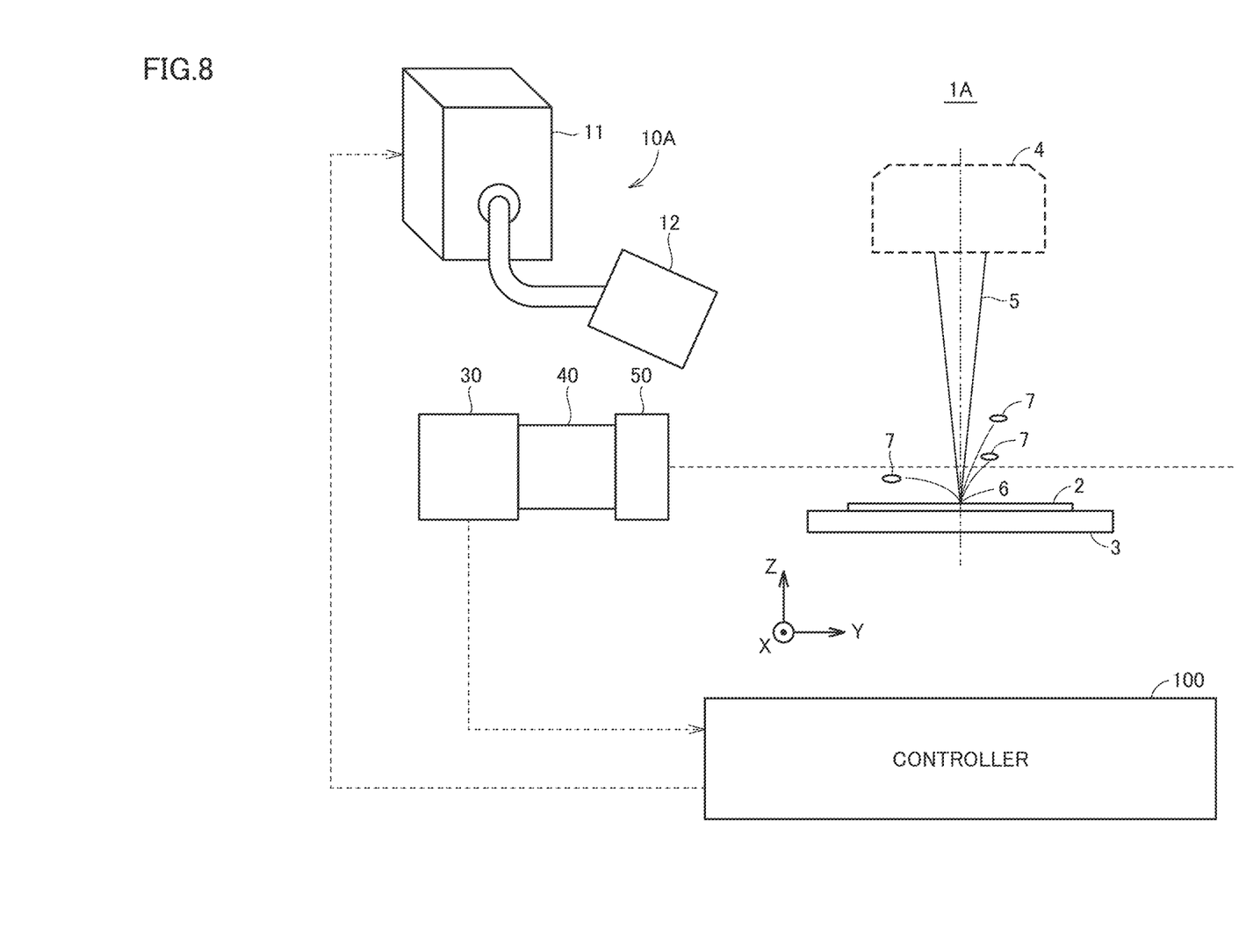
FIG. 8 is a second diagram schematically showing an exemplary overall configuration of a sputter measurement system.

FIG. 8 is a diagram schematically showing an exemplary overall configuration of a sputter measurement system 1A according to a modification 2. Sputter measurement system 1A shown in FIG. 8 is obtained by replacing back-light source 10 of sputter measurement system 1 shown in FIG. 1 with a front-light source 10A.

Front-light source 10A is disposed at a position at which sputter 7 is irradiated from the front side (the side on which the image is captured by camera 30). In this case, the light emitted by front-light source 10A is reflected by sputter 7 and reaches camera 30, with the result that the image of sputter 7 becomes a bright spot having a higher luminance than those of surroundings thereof.

In this way, the irradiation light for the observation of the sputter may be applied to the front side of sputter 7.

Modification 3

In the above-described embodiment, back-light source 10 that emits irradiation light for the observation of the sputter is included. However, the light source that emits irradiation light for the observation of the sputter may not be included.

Figure 9:
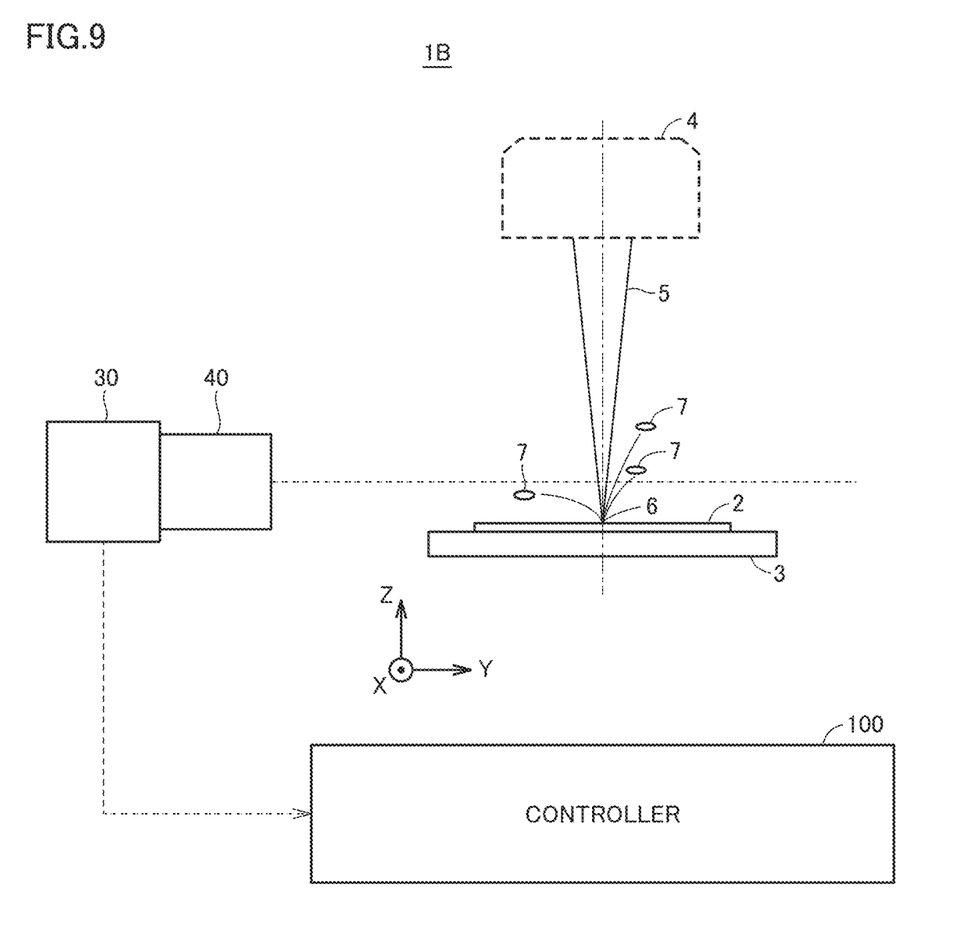
FIG. 9 is a third diagram schematically showing an exemplary overall configuration of a sputter measurement system.

Further, in the above-described embodiment, optical filter 50 that blocks the noise light is included. However, optical filter 50 may not be included. FIG. 9 is a diagram schematically showing an exemplary overall configuration of a sputter measurement system 1B according to a modification 3. Sputter measurement system 1B shown in FIG. 9 is obtained by removing back-light source 10 and optical filter 50 from sputter measurement system 1 shown in FIG. 1. In this case, the size of sputter 7 is measured based on image data obtained by capturing, in an image using camera 30, the light emitted by sputter 7.

Thus, the light source that emits the irradiation light for the observation of the sputter and the optical filter that blocks the noise light may not be included.

Although the embodiments of the present invention have been described and illustrated in detail, it is clearly understood that the same is by way of illustration and example only and is not to be taken by way of limitation. The scope of the present invention is defined by the terms of the claims, and is intended to include any modifications within the scope and meaning equivalent to the terms of the claims.

What is claimed is:

1. A sputter measurement system that measures a size of a sputter flying from a molten portion that is melted during welding, the sputter measurement system comprising:
   a camera that captures an image of an observation region including the molten portion;
   a telecentric lens disposed between the molten portion and the camera;
   a controller that measures the size of the sputter based on the image captured by the camera; and
   a back-light source that emits parallel light toward the molten portion, the back-light source being disposed at a position facing the camera with the molten portion being interposed between the back-light source and the camera, wherein
   a position of the molten portion is included in a depth-of-field region of the telecentric lens,
   the controller extracts a sputter image from the image captured by the camera,
   the controller classifies the extracted sputter image into a first sputter image having an edge with a gradation or a second sputter image having an edge with no gradation, and
   the controller measures a size of the second sputter image.

2. The sputter measurement system according to claim 1, further comprising an optical filter disposed between the molten portion and the camera.

3. The sputter measurement system according to claim 1, further comprising:
   a light source that emits light having a first wavelength toward the molten portion, the first wavelength being different from a wavelength of light generated at and around the molten portion during the welding; and
   an optical filter that allows the light having the first wavelength to pass through the optical filter and that blocks the light generated at and around the molten portion during the welding, the optical filter being disposed between the molten portion and the camera.

4. A sputter measurement system that measures a size of a sputter flying from a molten portion that is melted during welding, the sputter measurement system comprising:
   a camera that captures an image of an observation region including the molten portion;
   a telecentric lens disposed between the molten portion and the camera; and
   a controller that measures the size of the sputter based on the image captured by the camera, wherein
   a position of the molten portion is included in a depth-of-field region of the telecentric lens, and
   the camera captures the image of the observation region at a cycle shorter than a time for which the sputter is moved from the molten portion to outside of the depth-of-field region.

* * * * *